2,997,466
DECANTATION OF LIGNIN
Frank J. Ball, Charleston, and William G. Vardell, Summerville, S.C., assignors to West Virginia Pulp and Paper Company, New York, N.Y., a corporation of Delaware
Filed Nov. 4, 1958, Ser. No. 771,766
11 Claims. (Cl. 260—124)

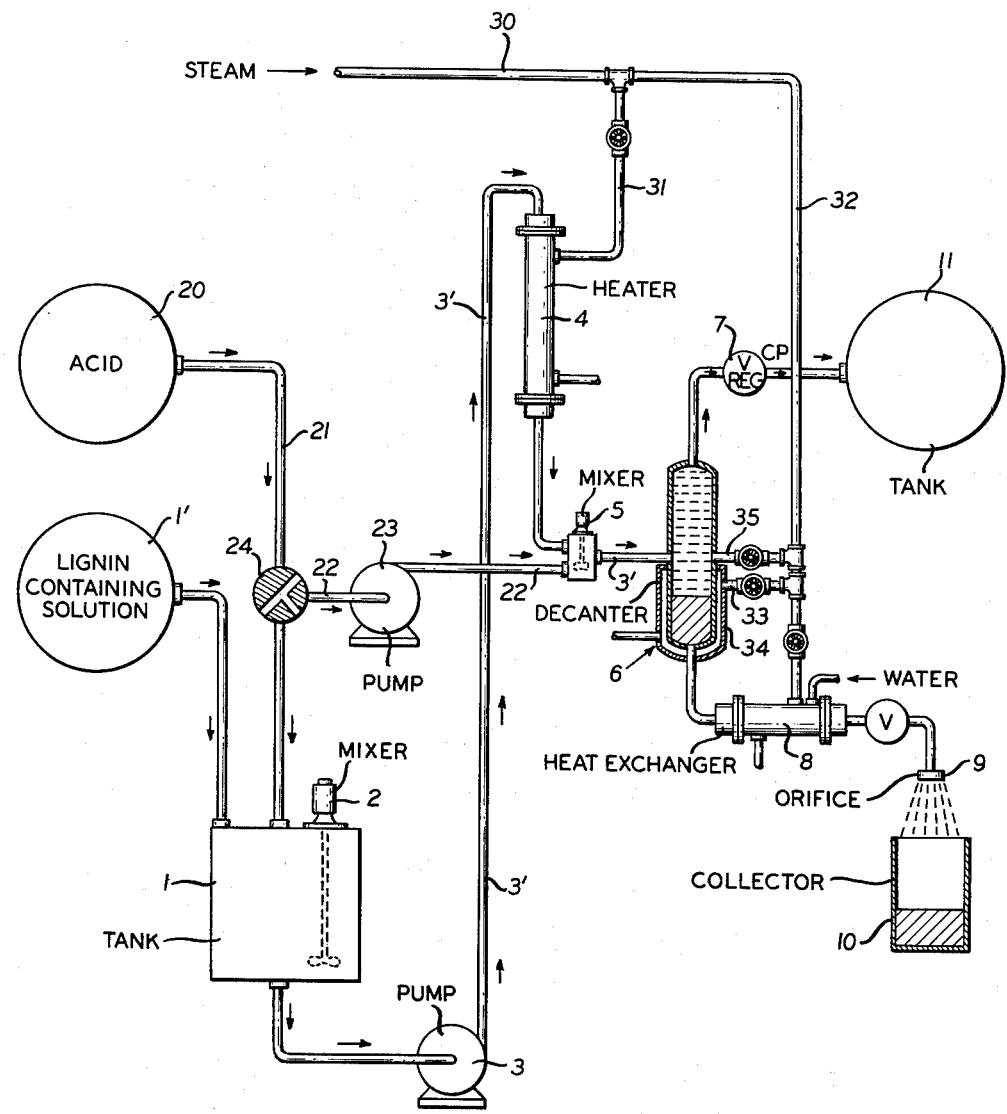

Our present invention relates to the manufacture of lignin and lignin compounds from black liquor. It also relates to the recovery of lignin salts thereof, especially the sodium salt.

The pulp waste liquors which result from the alkaline or sulfate pulping of lignocellulose material contain a mixture of organic materials dissolved in the highly alkaline waste liquor. The principal dissolved organic components are lignin, aliphatic acids, and saccharinic acids. Since these liquors are usually concentrated and burned in a smelter to recover the dissolved inorganic pulping chemicals as a smelt, thereby recovering only the fuel value of the organic material, a great deal of study has been expended in attempts to devise methods for recovering a portion of these organic materials as useful chemicals.

In commercial processes now in use, lignin in the form of its sodium salt is recovered as a crude product from skimmed black liquor of about 25–30% solids; the sodium lignate is precipitated from the black liquor by acidification thereof, often with carbon dioxide containing gases, an ample supply of which is to be found in most paper mills. This carbonation of the black liquor reduces the pH of the liquor from about 12 to about 9–10 and results in the precipitation of about three-fifths of the lignin in the liquor as sodium lignate, although the yield may be increased by the additional acidification of the liquor or by the use of more concentrated liquors. It cannot be materially increased by the further carbonation since very little more carbon dioxide from mill gases can be absorbed at pH's less than 9.5. By using pure carbon dioxide it is possible to reach a pH of about 7, but no lower. The use of strong acids, e.g., $H_2SO_4$, on the already carbonated liquor is wasteful since much of it merely serves to release the carbon dioxide already absorbed. When stronger black liquors are used for carbonation, the yield is greater but the advantage of greater yield is offset by the increased difficulty in handling the carbonated liquor which can quickly plug up heat exchanger surfaces, carbonating towers, filter surfaces, etc.

When the black liquor is carbonated or otherwise acidified in the ordinary way to a pH of 9–10, the sodium lignate precipitated is in colloidal form and cannot be effectively separated until it is coagulated. One method of doing this is to heat the carbonated liquor to about 200° F. During the heating the particles of the sodium lignate increase in size from about 0.5 micron to about 3 to 10 microns. The so coagulated liquor is then cooled to about 120–140° F. and filtered to yield a filter cake of 40–53% solids. The crude filter cake is then made into a slurry containing 38–40% solids and spray dried. (See Patent 2,464,828 issued March 22, 1949, on application of Pollak et al.) Another method of lignin manufacture similar to that disclosed in Patent 2,464,828, issued to Pollak et al., is disclosed in Patent 2,228,976, issued to Reboulet. In still another proposed method, the carbonated liquor is held at a temperature of around 194° F. in an open continuous decanter until the sodium lignate collects as a viscous layer which is then drawn off and subjected to further purification, such process being further disclosed in Patent 2,406,867 issued to Tomlinson et al. There are several disadvantages inherent to the Tomlinson process for lignate recovery which we have been able to overcome by use of our improved process.

For example, the Tomlinson process for decantation of sodium lignate cannot be applied to purified acid lignate (or hydrogen lignate as it will hereafter be referred to) recovery because hydrogen lignate will not fuse in water media at the heats attainable at atmospheric pressures. This is due to the differences in melting points between the sodium lignates and the hydrogen lignates; those of the hydrogen lignates being the higher of the two. Also when attempting to apply the Tomlinson method to the recovery of sodium lignates from black liquor derived from the kraft method of pulping southern pine, it was found that the liquid lignates formed, even when the black liquor started with was of low solids content, were too viscous to handle. Moreover, when the lignate mass was allowed to cool, excessive amounts of black liquor and of carbon dioxide were occluded, causing the mass to have a spongy appearance. Even so, the massive form of the fused cake made solution very difficult, and when dissolved, the solution could not be easily processed to obtain hydrogen lignate, since when acidified, the hydrogen lignate formed was in the colloidal state and required a separate step of coagulation. On the other hand, the sodium lignates obtained by our improved process are not only purer, but upon acidification readily yield hydrogen lignate in comparatively pure coagulated state.

Our present invention therefore, has for its principal object the improvement of such existing processes of lignin recovery and purification, and is predicated upon the concept of first acidifying the crude lignate material to the necessary pH, and then effecting the separation of the lignate material, i.e., sodium lignate, or hydrogen lignin itself, or mixtures of the two—if that is desired—under pressure in a pressure vessel, preferably of the decanter type, wherein the precipitated lignate is caused to separate into a fused liquid layer below a layer of mother liquor. The lignate layer is then withdrawn from the decanter by being admitted to a region of lower pressure. In this way the lignate product may be recovered as a finely divided powder. Or partially delignified black liquor, i.e. black liquor which has been treated with $CO_2$ to precipitate a portion of the lignin, and the lignin coagulated and filtered off, may be further acidified with acid if desired, then heated under pressure from 220–325° C. at temperatures above the atmospheric boiling point of the liquid and passed to the pressure decanter, thus causing the sodium lignate particles to coagulate and separate out as a layer below the mother liquor layer. It may be withdrawn as above pointed out. Further, if desired, the lignate solution (either black liquor or other lignin solution) may be otherwise acidified with acid either before or while in a heated state under superatmospheric pressure, and the lignin product recovered as previously mentioned. When hydrogen lignate itself is desired, the pH of the lignate solution will be brought down to around 2–4 and the temperature maintained sufficiently high to insure the necessary fluidity of the precipitated hydrogen lignate.

A still further object is to produce lignates from black liquor (or other aqueous lignate solution) by acidification substantially entirely with acids of suitable strength (depending upon the final pH desired) which are added to the heated black liquor under superatmospheric pressure, thereby continuously to precipitate the lignin as a fused liquefied mass which is separated by decantation. In this manner the heating of precipitated colloidal lignin or slurry with attendant difficulty of deposit of lignin upon the heating surfaces is avoided, and the result is achieved of the simultaneous acidification and coagulation of the lignates.

By our improved process we achieve the following advantages, inter alia:

(1) We can obtain dry sodium or hydrogen lignates in solid or powder forms as we may desire by heating them to the elevated temperatures at the superatmospheric pressures to fuse them in viscous masses and causing the liquid lignates to issue from the region of high pressure. They may be recovered in a finely divided state directly in the form of a powder or as rods or tubes, depending on the shape and size of the issuing orifice, the method of reducing the superatmospheric pressures and the physical states of the liquefied lignates at the temperatures being used;

(2) The higher temperatures possible on account of the superatmospheric pressures cause the liquefied lignates to be more fluid and therefore enables black liquor or other lignate containing solutions of higher solids contents to be processed. Also the advantage is had that it is possible to heat solutions of lignates rather than slurries thereof with less attendant danger of having the lignates deposit out upon the heating surfaces.

(3) By avoidance of gas evolution in the decanter because of the superatmospheric pressure therein, no danger is had of the formation of spongy products containing large amounts of occluded liquors, and further, the higher temperatures possible on account of the superatmospheric pressures also contribute materially to the settling rate of the lignates in that the lignates fuse more rapidly to a mass with little occluded mother liquor;

(4) While carbonated liquors cannot in the ordinary way be successfully or economically acidified with stronger acids to give higher yields because of the release of carbon dioxide, such acidification is possible under pressures which prevent release of the $CO_2$.

(5) When strong acid is added to the black liquor in an amount to bring the pH below appreciably 9, some hydrogen lignate, as distinguished from sodium lignate, will be formed and such formation will be complete when the pH has been brought down to a value of 2 or somewhat higher. In such case the lignate withdrawn will be hydrogen lignate or lignin per se. It is therefore possible to obtain a hydrogen lignate directly from black liquor by acidification before or after application of superatmospheric pressures and heat by continuously or batchwise fusion and decantation in a single step. It is thus possible to accomplish a fractionation of the lignin contained in the black liquor between any desired pH intervals by adding an increment of acid sufficient to bring about precipitation to the desired pH, removing the liquid lignin formed by decantation, then adding a further increment of acid and obtaining a further fractionation of the lignin. When such fractionation is desired, it will give advantage to employ additional decanters with the necessary piping, etc. for transfer of the mother liquor and for adding acid thereto, etc.;

(6) It is possible to modify the properties of the final lignate products by holding them at the elevated temperatures while in the fused, liquid state. Differences in melting points and acetone solubility, for example, are readily obtainable by such treatment.

Further objects and advantages will be evident as the description proceeds, and the novel features will be pointed out in the claims.

For a more complete understanding of our invention, reference may now be had to the following detailed description and examples taken with the annexed drawing showing schematically suitable apparatus for carrying out illustrative embodiments of the invention.

The lignate containing solutions may be placed in tank 1 from bulk supply tank 1' and acidified with acid while mixing by means of mixer 2 before proceeding with the pressure separation embodied in our process. Or the lignate containing solutions may be continuously acidified in mixer 5 with the acid from tank 20 supplied through pipe 21, pipe 22, pump 23, 3-way valve 24 being placed in the junction between pipes 21 and 22. Either of the steps is satisfactory for use in our process. The lignate containing solutions are pumped through pump 3 having a variable drive (not shown), and heater 4 before being fed into the steam-jacketed decanter 6 (steam jacket 34), by way of mixer 5 for example. The charged decanter 6 if necessary, is heated with preferably live steam to the desired temperature, although any other means of heating may be used. The system is subjected to the desired pressure by means of the variable drive pump 3 which is further controlled by pressure regulating valve 7. The entire system from the heater 4 to the valve ahead of orifice 9 is thus under pressure. The pressures used are those required to prevent boiling of the lignate containing solutions or slurries when the temperatures are increased to those preferred in the particular process. The lignate masses fuse in the bottom of the decanter 6 and are withdrawn through heat exchanger 8 and orifice 9. The internal pressure of the decanter will force the lignate masses through orifices of desired configuration. The lignate masses may be recovered in several forms. At the higher temperatures and pressures, it is possible to collect the lignates as finely divided powders by merely allowing the lignate masses to extrude through a spray nozzle type orifice. As the lignate masses are forced through the nozzle and the pressure is relieved to atmospheric, the water in the hot lignate masses flashes to steam leaving relatively dry lignate products, the explosive force of the escaping steam serving to disintegrate the lignates into the powders. In other cases, it may be desirable to collect the lignates as rods or tubes by merely changing the configuration of the orifice 9 and lowering the lignate masses temperatures and pressures before allowing them to be forced through the orifices. If it is desired to operate the process at the most economical heat balance while yet collecting the lignates as powders, it is possible to fuse the lignates in the pressure decanter 6 at temperatures as low as 220° F. and raise the temperatures to those necessary for "blowing" into powders by increasing the temperatures of the fused lignate masses by passing them still under pressure through heat exchanger 8 heated with steam or other means. Conversely, when operating the decanter at higher pressures and temperatures and desiring a cooler mass for extrusion into rods, for example, the heat exchanger 8 cooled with water may be used to reduce the temperatures of the fused lignate masses. In all cases, the lignates are collected in some suitable form of collector 10, such as a bag, tank, spray drier, etc. The mother liquors or decantates are removed from the system into tank 11 or into a recovery cycle dependent on whether or not the process is operated as a batch or continuous system. Provision is also made for adding heat to the contents of the decanter 6 as by the admission of live steam thereto by means of line 12.

Steam is supplied to the various points needed by means of main line 30, branch line 31 to heater 4, branch line 32 to heat exchanger 8, branch line 33 to jacket 34 of the decanter 6, and finally branch line 35 to supply live steam to the decanter 6.

In our process it is obvious that any lignate containing solution capable of being precipitated with acid or water dilution may be used as the source of the lignates, particularly those from the soda or kraft pulping of hard or soft woods. Thus, in some cases it may be preferable to use a black liquor partially acidified with carbon dioxide as the source. In other cases, unacidified black liquor or aqueous solutions of lignin salts may be used. In still others, spent liquors from hydrotropic pulping may be used, as will be discussed in greater detail, post.

The pH to which the lignate mass is acidified will vary with the source material and the final product desired. For example, sodium lignates may be precipitated and recovered in stages by acidification to a given pH followed by decantation of the lignate so precipitated and re-acidification of the mother liquor, etc., with the final stage yielding hydrogen lignate, if this is desired. Hydrogen lignates may be made from the same black liquor simply by further acidification of the black liquor. Some modifications in temperature and pressure may be required for the manufacture of the different products.

The point of addition of the acid to the lignate containing solutions is not critical nor is the type of acid used nor the concentration used, due regard being had to the fact already stated that $CO_2$ gas at atmospheric pressure cannot be used to lower the pH below range of 9–10. Any type mixer of the proportional type may be used for mixing the acid with the lignate containing solution when this method of addition is used. Or, if desired, a simple mixer with a metered supply of acid and lignate containing solutions may be used.

It is understood that the design of the decanter is not critical and that any suitable design of a decanter type is equally applicable to our process. The method of releasing the lignate mass from the decanter is likewise not critical in our process. We used a Fulljet Type HH standard spray nozzle made by the Spray Company for recovery of the lignates as powders, although any other standard spray nozzle may be used. The fused lignate mass can equally as well be extruded through other type orifices to form rods or tubes as described. The process may also be batch or continuous in operation.

In our decanter, we determined the depth of the fused lignates by use of a sight glass. However, at the temperatures used the lignin is liquid enough to allow use of floats or other measuring devices to measure the depths of the layers and to connect these floats or other measuring devices with controls for automatic or semi-automatic operation. The same is true for pressure or temperature controlling devices.

In the preferred embodiment of our invention however, we recover the lignates as powders in a continuous process in which the lignate containing solutions are acidified with sulfuric acid continuously by metering the proper amount of acid and lignate containing solutions through the mixer 5. Actually, we have found it is possible to continuously acidify high solids lignate solutions with concentrated acids in our process as disclosed in our copending application Serial Number 771,784 though in practice is is not necessary to use the concentrated acids to make our improved process operable.

In a more specific embodiment of our invention, we prefer to carbonate black liquor from kraft pulping of southern pine wood to pH 9–10 to precipitate about three-fifths of the sodium lignate present. The carbonated black liquor is heated to about 190° F. to coagulate the sodium lignate, the mixture is cooled and filtered on an Oliver type continuous filter. The occluded black liquor is washed from the sodium lignate filter cake with sprays of brine or water containing dissolved sodium sulfate an/or water alone to remove as many impurities as possible from the precipitated sodium lignate. The sodium lignate filter cake is redissolved in water and further acidified to pH near 2 with sulfuric acid to precipitate the lignin in its hydrogen lignate form. This slurry is subjected to pressure decantation to fuse the hydrogen lignate into the viscous fluid mass. The mass is forced through a nozzle type orifice as it is released to atmospheric pressures and temperatures. The water flashes from the hydrogen lignate as it emerges from the nozzle with explosive force and the hydrogen lignate is recovered as a dry, free flowing powder.

In still another embodiment of our invention, we use the sodium lignate recovered from black liquor carbonation, coagulation and filtration or the sodium lignate from black liquor carbonation and fusion to one mass without being washed as our raw material. The sodium lignates are not redissolved and precipitated as the hydrogen lignates. We place the sodium lignates in the decanter and subject them to pressure decantation to recover dried sodium lignates in any of the forms mentioned, preferably as powders.

In some cases, it may be desirable to wash the lignates in the decanter before collection. This is practical by simple modification of the decanter to include some mixing device in the lignate settling area. The decantates from any of the fused lignate masses can be removed and replaced with the washing material, water or any other liquid. The liquid can be in its pure state or could be in combination with other liquids and could contain dissolved materials as desired. The washing can be carried out by agitating the wash liquids into intimate contact with the liquid lignates in manners similar to the well-known methods for washing fats and oils. After washing, the liquid lignates may be collected in any of the described forms as desired.

The following examples are illustrative of our improved process. They should not however, be construed as limiting the same beyond the scope of the appended claims.

*Example 1(a)*

A series of experiments were made with black liquors derived from the pulping of southern pine wood to determine the most desirable temperature for operating our pressure decantation process. The black liquors had solids contents of from 27–32 percent. They were carbonated to pH values of about 9.7 and pumped into the decanter 6. They were there subjected to temperatures up to 305° F. while maintaining the pressure there at 150 pounds per square inch, passage through heater 4 having raised the temperature initially which is thereafter maintained or increased by steam through line 12. The process was operated in a continuous fashion. The total holding time in the decanter was 1 to 2 hours. With the exception below noted, each of the sodium lignates fused in the decanter to liquid, viscous masses. The sodium lignates were collected as powders by allowing them to be extruded through a nozzle type orifice at the completion of the holding times. The ash contents of the products were determined by standard combustion techniques using a muffle furnace and platinum crucibles. The conditions for treating the black liquors and the ash contents of the final sodium lignate products as compared with a commercial sodium lignate (Indulin C, a product of the Polychemicals Division of West Virginia Pulp and Paper Company) recovered by coagulation and filtration at temperatures below 200° F. are shown in the following table.

| Black Liquor Solids, percent | pH | Temperature in Decanter, °F. | Pressure in Decanter, p.s.i. | Ash Content, Percent |
|---|---|---|---|---|
| Commercial sodium lignate (Indulin C) | | | | 21.3 |
| 32 | 9.7 | 210 | 150 | (¹) |
| 29 | 9.7 | 230 | 150 | 15.2 |
| 31 | 9.9 | 285 | 150 | 15.5 |
| 30 | 9.5 | 300 | 150 | 15.5 |
| 27 | 9.7 | 325 | 150 | 15.2 |
| 29 | 9.8 | 350 | 150 | 16.6 |

¹ Would not extrude through nozzle, the temperature being too low.

*Example 1(b)*

In this run, the following conditions were observed:

Black liquor solids _____ 30.9
Temperature at mixing _____° F__ 230
pH of acidified liquor _____ 10.6
Ash content of recovered lignin _____ 21.2

This example is given as an upper limit of the pH range which we regard as practicable in the process.

In another run the pH of the acidified black liquor was carried to 7.2 with a yield of 238 pounds lignate product per 1000 pounds black liquor solids, the ash content of which was 12.6, indicating the presence of some hydrogen lignate. In these runs the pressure used in the acidification is sufficient to keep all the $CO_2$ dissolved, whereby none escapes in the decanter to cause the lignate mass to become spongy.

It is essential that the black liquor and acid be adequately mixed since otherwise pocketing of acid in the coagulated lignin will result. Even so, considerable variation may be had in the amount of agitation performed. Thus we have had satisfactory results when the shaft attached to motor 5 has run at from 127 to 700 r.p.m.

When lignin per se, i.e. hydrogen lignate is desired as a product from the decanter, the black liquor will be acidified preferably to a pH of approximately 2. To insure against the fluid lignin in the decanter becoming spongy, it is desirable that the presence of gases, as for example $CO_2$ or $H_2$, which latter may be formed by the action of the acid upon the iron container or pipes or other surface, be avoided. It is also desirable that a comparatively high temperature be maintained, i.e., between 270° to 375° F. in the decanter, with preference for the higher temperature, i.e., around 375° F., whereby the desired fluidity of the hydrogen lignate may be had.

*Example 2*

This example gives a comparison of our improved pressure decantation process with those not involving this feature.

Black liquors derived from the pulping of southern pine wood and having solids contents of 26–27 percent were carbonated to pH 9.7. Sample (1) was coagulated and filtered in the usual manner of recovering sodium lignate. Sample (2) was heated without agitation as taught by Tomlinson and fused to a mass before separation. Sample (3) was heated with pressure applied and fused to a mass before separation. The sodium lignate separated by the pressure decantation contained markedly less ash than either of the other samples and had occluded less black liquor impurities than either of the two sodium lignates removed from the black liquor by the usual processes. The results are shown in the following table.

|     | Black Liquor Solids | Temperature, ° F. | Pressure, p.s.i. | Ash Content, Percent |
|-----|---------------------|-------------------|------------------|----------------------|
| (1) | 26.4 | a 199 |     | 21.3 |
| (2) | 26.4 | b 190 |     | 21.5 |
| (3) | 27   | b 275 | 150 | 15.4 | a Agitated, cooled and filtered.
b Not agitated and decanted.

*Example 3*

As demonstrated in Doughty 2,802,815 the properties of lignin can be modified by various treatments to yield products with different physical properties such as different melting points or solubilities when dissolved in organic solvents or stabilities when mixed with neoprene latices. While the degrees of modification of the lignin may be measured in other ways, a most convenient method of determining these differences has been by observing their solubilities in acetone.

We have found that we can modify the hydrogen lignates (or lignin itself) by heat treatment of the sodium lignates in our pressure decantation system prior to subsequent removal of the sodium to produce hydrogen lignates.

For example, we found that acetone solubilities of hydrogen lignates recovered from the sodium lignates separated from the lignate containing solutions in our system when held for long periods of time, at the elevated temperatures and superatmospheric pressures in our system were lower than those of the hydrogen lignates recovered from the sodium lignates separated from the lignate containing solutions processed through our system in normal operations, that is, continuously with hold-up period of one to two hours in the decanter. To demonstrate the differences in acetone solubilities of the hydrogen lignate products we ran a series of experiments with various hold-up times at the elevated temperatures and superatmospheric pressures in our system. We measured these changes in the properties of the hydrogen lignates by differences in their solubilities in acetone. The method we used for determining acetone solubilities was as follows: completely dry lignin samples of 25 grams each were placed in 250 ml. tared centrifuge bottles. 100 ml. acetone was added to each and the whole stirred with an electric mixer for 15 to 20 minutes. The lignin-acetone mixtures were then centrifuged at 1500 r.p.m. for about 5 minutes. The liquid portions were decanted off and an additional 100 ml. of acetone added to the residual lignins. The stirring, centrifuging and decanting were repeated until no color was imparted to the acetone of the lignin-acetone mixtures. After the final decantation the residual lignins were air dried for several hours and then dried in an oven at 105° C. overnight. The amount of soluble lignin was determined in each case by difference.

Since the melting points of the lignins are also indications of further reaction or polymerization, we measured the temperatures at which the modified lignins first began to sinter or coalesce from their powder forms towards a fusing mass and the temperatures at which such mass had completely fused to the viscous, flowing state.

We ran three series of experiments to demonstrate the differences in acetone solubilities of the hydrogen lignate products made from sodium lignates recovered as disclosed earlier in our pressure decantation system. We used a black liquor derived from the pulping of southern pine wood and having a specific gravity of 1.154, a solids content of 27.1 percent carbonated to a pH of 9.7. We held the sodium lignates in the decanter at pressures of 150 pounds per square inch at temperatures of 230° F., 270° F. and 325° F. for various periods of time before recovering the products as finely divided powders through the nozzle type orifice described earlier. The sodium lignates were dissolved in water, acidified to pH 2–4 to precipitate the hydrogen lignates, heated to coagulate, cooled, filtered, water washed and dried in an oven at 105° C. The acetone solubilities of the products were determined as described above. The effects of the different holding times at the various temperatures on the acetone solubilities are shown below in the following table.

| Holding Temperature, ° F. | Time, Hrs. | Acetone Solubility, Percent | Temperature | |
|---|---|---|---|---|
|   |   |   | Sintering, ° C. | Melting, ° C. |
| 290 a | 0 | 48–52 | 175 | 235 |
| 230 | 0 | 48 |   |   |
| 230 | 86 | 38 |   |   |
| 230 | 168 | 23 | 195 | 305 |
| 270 | 0 | 45 |   |   |
| 270 | 3.5 | 41 |   |   |
| 270 | 20 | 17 | 200 | 330 |
| 325 | 16 | (b) |   |   | a Composite of several runs at this temperature to show normal ranges of sintering and melting temperatures.
b Was not completely soluble in hot aqueous alkali.

It is thus apparent that at elevated temperatures the sodium lignates under pressure are still undergoing reaction or polymerization and the speed of this action increases with the rise in temperature. The reaction or polymerization is very slow at 230–35° F. causing very little change in the lignin in 168 hours, but is rapid enough at 325° F. to partially insolubilize the sodium lignate in water in less than 16 hours.

It is possible that the high temperature and holding time might be purposely used to produce a modified lignin of low acetone solubility and corresponding high melting point since the two apparently are co-related. Modified lignins with high melting points and low acetone solubilities resemble lignins which have been oxidized by any of the known oxidation methods such as bubbling air or oxygen through lignin containing solutions before recovering the lignin as salts (lignates) or as the hydrogen lignin itself by any of the known processes. The melting points of the various lignin samples shown in the table above confirm that the lignins are modified by the holding processes described. It is apparent that other lignin products could be obtained by changing the holding times or temperatures.

*Example 4*

We found the sodium lignate powders as they are issued through a nozzle type orifice in our process are in such physical form as to make acid washing to hydrogen lignates a simple matter. For example, we collected thirty pounds of powdered sodium lignate from our process and stirred it directly into 16 gallons of water which had been previously acidified with 5.25 pounds of 60° Baumé sulfuric acid. This is the same amount of acid as we calculated would be necessary to precipitate an equal amount of sodium lignate from solution at pH about 2 in the form of hydrogen lignate. The acid slurry was filtered, washed and dried. This acid washed product contained 0.27 percent ash. This ash content is comparable to the ash content of the commercial purified alkali lignin, Indulin A, produced by Polychemicals Division of West Virginia Pulp and Paper Company. It is also possible to wash the powdered sodium lignates of our invention continuously on filters with acid to produce hydrogen lignates with comparable ash contents. It was not necessary to coagulate the hydrogen lignate formed.

*Example 5*

We examined the organic solvents solubilities of our hydrogen lignate made by means of our improved process (Example 4) and compared them with the solubilities for a typical commercial purified alkali product such as Indulin A, sold by the Polychemicals Division of West Virginia Pulp and Paper Company and found our products equally as soluble in all solvents as the commercial product. Further, we compounded our purified lignates into a GR-S Type II (75% butadiene-25% styrene) coprecipitate as disclosed in Pollak 2,608,537. We found that our hydrogen lignates reinforced the rubber equally as well as the commercial product, Indulin A. The formulation compounding, curing and test procedures we used are those disclosed in the booklet L-4 "Indulin for Reinforcing Rubber," published by the Industrial Chemical Sales Division of West Virginia Pulp and Paper Company. At a 50 volume loading of our hydrogen lignates we found the tensile strength of the reinforced rubber to be 2730 pounds per square inch, tear resistance 350 pounds per inch and elongation 680%, all of which were typical of GR-S rubber coprecipitates made at a similar loading with the commercial lignin, Indulin A.

Other established uses for lignin of the type we produce in our improved process or the salts thereof, are in adhesives, adsorbents, battery plate expanders, binders, cement formulations, corrosion inhibitors, drilling muds, emulsions, flotation, fungicides and insecticides, grinding aids, inks, sequestering agents, resins and plastics, lacquers, lubricants, tanning agents, water treatment and dispersing agents.

*Example 6*

Our improved pressure decantation process for lignin recovery is by no means restricted to use with lignins recovered from pulping woods with inorganic chemicals such as those found in the soda or kraft pulping processes. The pressure decantation of lignin is an advantageous step in recovering lignin from any lignin containing solution whether organic or inorganic in origin. An example of the applicability of our improved process is its use with liquors from the so-called hydrotropic pulping process as disclosed in the specification of Patents 2,308,564 and 2,731,344 issued to Ralph H. McKee. In this type process, lignin is extracted from lignocellulose material as free lignin rather than as a sodium lignate or sulfonated lignate salts in the commonly used pulping processes. The water insoluble lignin is dissolved from the wood chip or other lignocellulose material with concentrated aqueous solutions of a number of salts. Such are near-saturated solutions of benzoic, salicylic, benzene-sulfonic, xylene-sulfonic, cymene-sulfonic and napthalene-sulfonic acid salts. McKee prefers the use of sodium-xylene-sulfonate solutions in his pulping processes. In these processes, the water insoluble lignin is dissolved, for example, in concentrated (25–30 percent solids) sodium xylene sulfonate solution. The lignin is precipitated from the hot spent liquor from the chips by diluting the liquor to sodium xylene sulfonate concentrations of 10–15 percent. At this dilution the lignin is no longer soluble and is precipitated, filtered and the lignin free liquor evaporated to high concentration for reuse. We made an experiment to demonstrate the applicability of our pressure decantation process to the spent liquors from hydrotropic pulping. We dissolved purified alkali lignin (Indulin A, sold by the Polychemicals Division of West Virginia Pulp and Paper Company) in a 30 percent solids water solution of sodium xylene sulfonate (specific gravity 1.116) at 200° F. to simulate a sodium xylene sulfonate spent pulping liquor. When this solution was diluted with water hydrogen lignate was precipitated in colloidal form. We were able to coagulate hydrogen lignate to a filterable solid at 190–200° F. without any evident fusing to the viscous-liquid mass we note in our pressure decantation process. When the precipitated hydrogen lignate slurry was heated to 330° F. in a closed system under a pressure of 103 pounds per square inch, the hydrogen lignate fused to the viscous-liquid mass typical of those found in other hydrogen lignate masses under similar conditions. This viscous-liquid mass can be separated from the sodium xylene sulfonate solution by decantation. A satisfactory way to proceed is to bring about the coagulation of the lignin at a temperature between 230° and 300° F., the precipitated lignin formed passed as a liquid into heater 4 and there heated to in excess of 230° F., but less than 350° F. Furthermore, when precipitating the lignin by water dilution, it is advisable to do so with water that is heated to the decantation temperature and that the solvent containing the lignin in solution likewise be so heated. Thereby the fouling of the heat exchanger surfaces is prevented.

The property lignin exhibits in hydrotropic solutions is typical of its action in some water miscible pure organic solvents suggested for pulping. For example, triethylene glycol can be used as a solvent for lignin in wood chips. The lignin may be precipitated from the spent triethylene glycol liquor by water dilution in a manner similar to that disclosed in the hydrotropic pulping processes. The lignin is recovered as a precipitate by filtration. By use of our pressure decantation process the precipitated lignin may similarly be recovered from other organic solvent pulping processes.

Although our work was carried out with sodium lignates from kraft pulping of southern pine wood, the process is obviously not limited to the recovery of sodium salts of lignin or the hydrogen lignates from these sodium salts. In Europe, for example, solutions of lignate salts of other equivalent minerals such as potassium are available from pulping operations. These could be equally as well processed by our improved process as our sodium base pulping liquors. In addition, since the system is under superatmospheric pressure, our process is ideally suited for recovery of lignates from ammonia base pulping. The lignates dissolved as ammonium salts may be recovered and the ammonia vapors also recovered. Our improved process, then, is applicable to all solutions containing dissolved lignates where the lignates are in the form of alkaline mineral or ammonium salts.

We claim:

1. In the method of recovering lignates from lignin bearing solutions, the steps of coagulating colloidally precipitated lignate by maintaining a slurry thereof in water in a zone of quiescence, wherein the slurry is maintained under superatmospheric pressure and at a temperature above the melting point of the lignate until said slurry deposits coagulated lignate in a fused lower layer separate from an upper layer of mother liquor, and thereafter removing said fused layer by decantation.

2. In the method of recovering lignates, the steps which consist in heating an aqueous lignate-bearing liquor to above its atmospheric boiling point in a zone of superatmospheric pressure which is at least sufficient to prevent boiling of said liquor, reducing the pH of said liquor started with to a point of lignate precipitation by addition of a suitable acidic substance, conducting the so treated liquor to a zone of quiescence wherein the liquor still maintained at a temperature above the atmospheric boiling point, and above the melting point of the lignate, and under substantially said superatmospheric pressure is allowed to deposit coagulated lignate in a fused lower layer separate from an upper layer of mother liquor, and thereafter removing said fused layer by decantation.

3. The method according to claim 2 in which the layer of liquefied lignate is admitted to a zone of diminished pressure in the form of a spray whereby said lignate is recovered as a powder.

4. The method according to claim 2 in which the liquor started with is black liquor containing in excess of 14% solids.

5. The method according to claim 4 in which the liquor started with has a pH greater than 9.7, and said method includes the step of adding a suitable strong acid to said liquor while the same is at a temperature maintained above its boiling point, mixing said acid and liquor and causing said lignate to be precipitated and substantially simultaneously coagulated.

6. The method according to claim 4 in which the amount of acid added to said liquor is such as to yield sodium lignate as the product discharged to said diminished pressure zone.

7. The method according to claim 4 in which the amount of strong acid added to said liquor is such as to bring the pH of the same down to as low as 2, whereby the decanted product is hydrogen lignate.

8. The method according to claim 2 in which the coagulation of the lignate is brought about at a temperature between 230 and 300° F., and the precipitated lignate formed is passed as liquid through a heater and there heated further in excess of 230° F. but less than 350° F. and then flashed off as a powder.

9. In the method of recovering lignates the steps of precipitating lignates from an aqueous hydrotropic organic solution thereof by adding water thereto, thereby precipitating the lignate therein in colloidal form as a slurry, maintaining said slurry in a zone of quiescence at temperatures above the melting point of the lignate wherein the slurry is allowed to deposit coagulated lignate in a fused lower layer separate from an upper layer of mother liquor, and thereafter removing the said fused layer by admitting same to a zone of lower pressure.

10. The method according to claim 9 in which said aqueous hydrotropic lignate-bearing liquor contains sodium xylene sulfonate and the lignate recovered is hydrogen lignate.

11. The method according to claim 10 in which the coagulation of the lignate is brought about at a temperature between 230 and 350° F., and the precipitated lignate formed is passed as liquid through a heater and there heated further in excess of 230° F. but less than 350° F., and then flashed off as a powder.

References Cited in the file of this patent

UNITED STATES PATENTS

| | | |
|---|---|---|
| 2,228,976 | Reboulet | Jan. 14, 1941 |
| 2,623,040 | Keilen | Dec. 23, 1952 |
| 2,640,052 | Stoddard | May 26, 1953 |
| 2,828,297 | Giesen | Mar. 25, 1958 |